March 3, 1970  A. R. TYBOUT  3,497,914
BLENDING AND EXTRUDING MACHINE FOR THERMOPLASTIC
Filed Nov. 15, 1967  4 Sheets-Sheet 1

AART R. TYBOUT
INVENTOR.

BY Buhler & Amett
ATTORNEYS

AART R. TYBOUT
INVENTOR.

BY Buehler & Arant
ATTORNEYS

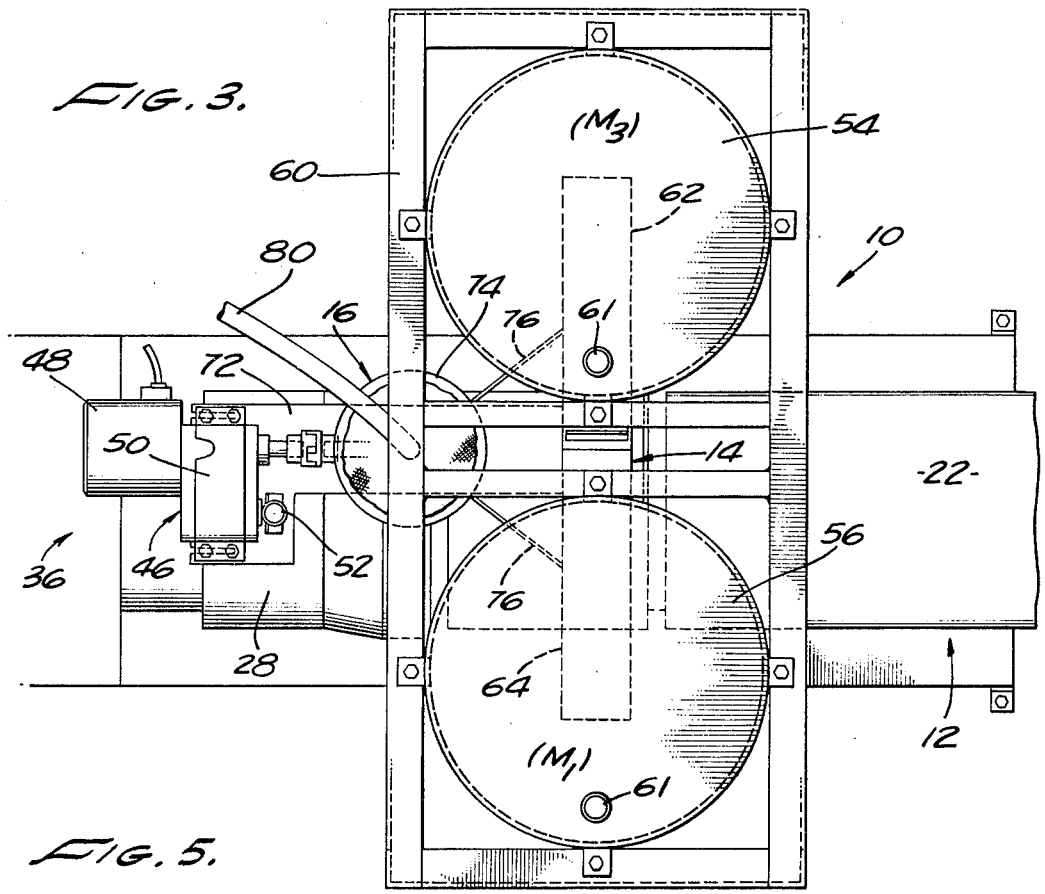
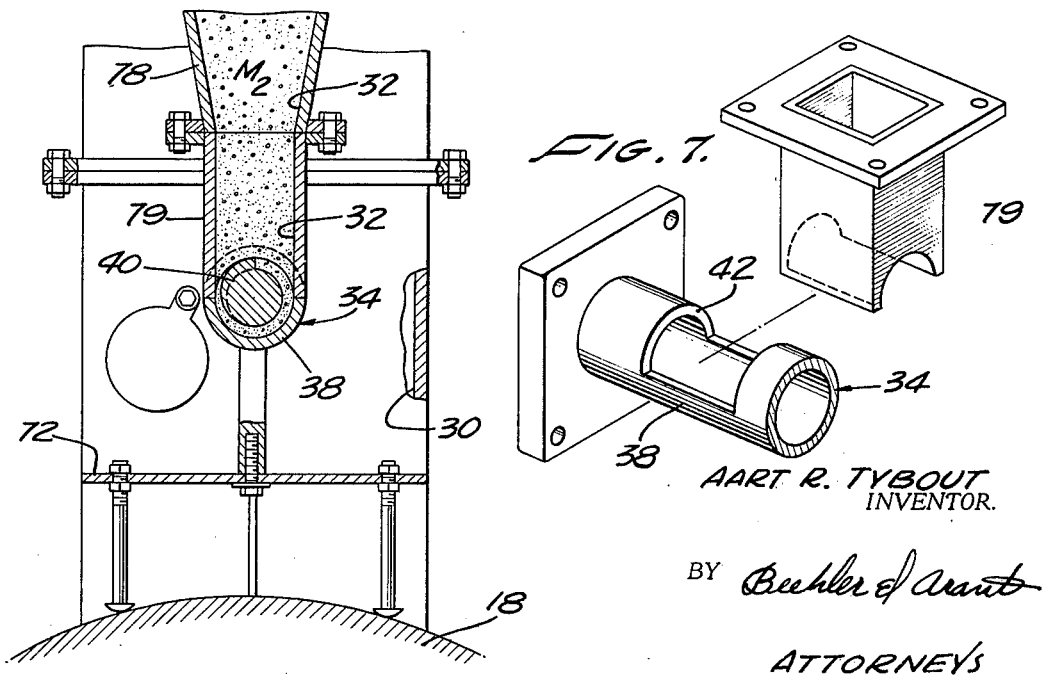

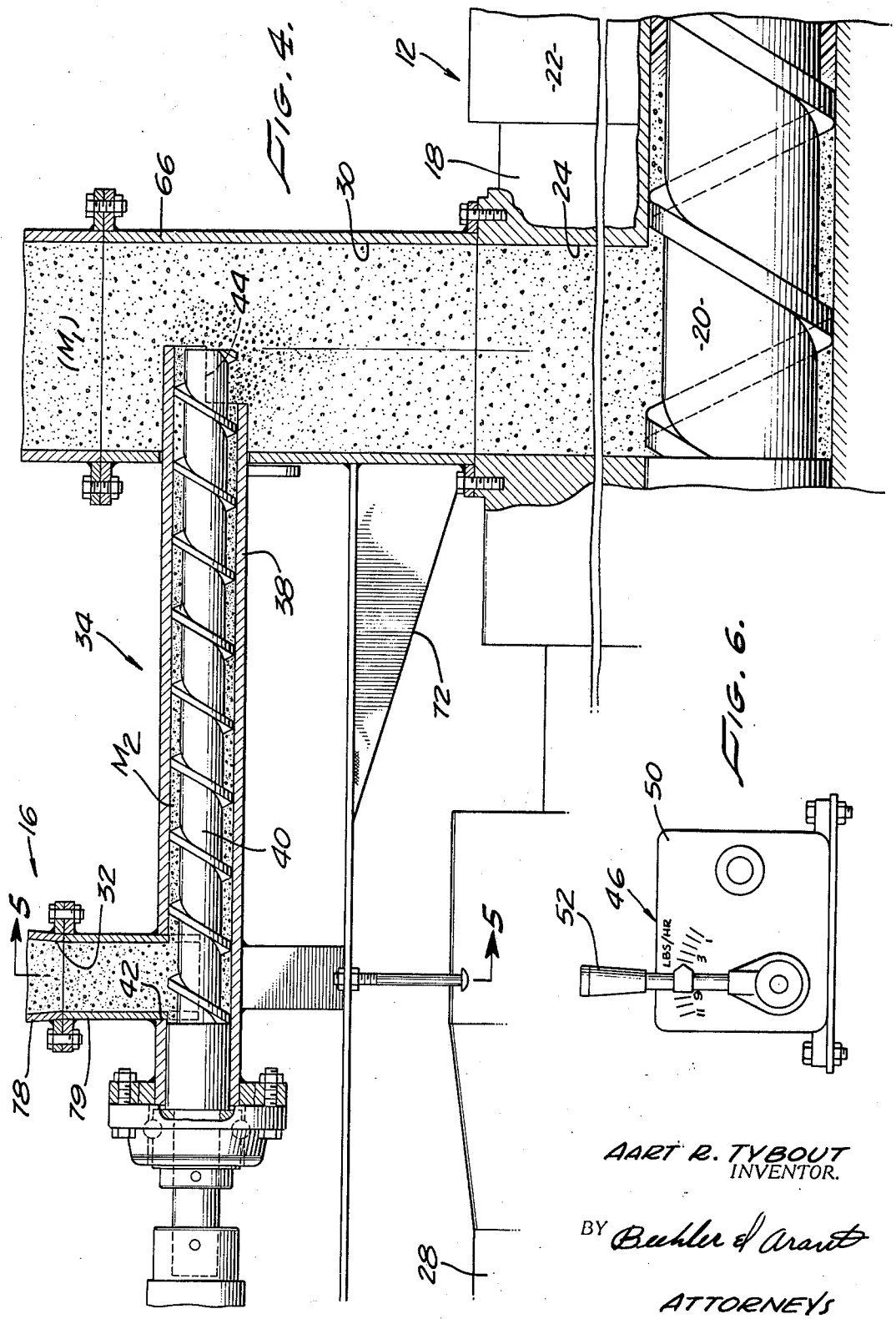

United States Patent Office 3,497,914
Patented Mar. 3, 1970

3,497,914
BLENDING AND EXTRUDING MACHINE
FOR THERMOPLASTIC
Aart R. Tybout, Gardena, Calif., assignor to Shell Oil
Company, New York, N.Y., a corporation of Delaware
Filed Nov. 15, 1967, Ser. No. 683,250
Int. Cl. B29f 3/02
U.S. Cl. 18—12                                    6 Claims

ABSTRACT OF THE DISCLOSURE

A machine for blending and extruding granular thermoplastic work materials, such as a base material and a color concentrate, the machine having a screw extruder receiving a first work material through an infeed passage and a variable speed conveyor feeding a second work material into the passage to provide a homogeneous thermoplastic mixture which is plasticized and extruded by the extruder and contains the work materials in regulated proportions which may be selectively variated by adjusting the conveyor infeed rate.

Background of the invention

Field of the Invention: This invention relates generally to a machine for processing granular thermoplastic work materials. More particularly, the invention relates to a machine for blending, plasticizing, and extruding such work materials.

As will appear from the ensuing description, the machine of the invention may be utilized for processing various thermoplastic work materials. The primary application of the machine, however, involves blending a thermoplastic color concentrate with a thermoplastic base material to provide a homogeneous thermoplastic mixture which is then plasticized and extruded in the form of a homogeneous colored plastic product. This product may be rolled into sheets or otherwise shaped. For the sake of illustration, the invention will be disclosed in connection with this particular application.

Prior art

A variety of blending and extruding machines of the general class described have been devised. Typical machines of this type, for example, are disclosed in prior art patents as follows; Eberhard 1,083,275; Eberhard 1,095,979; Siemens-Schuckertwerke (Walter Hyprath) 1,080,646; Stober 2,470,001; Van Riper 3,192,293; Delorme 2,174,779; Murray 2,632,204; Allemann et al. 2,674,007; Spreeuwers 3,148,412; Moscicki 3,178,497; and Cornelius et al. 3,291,883. Such machines may be generally classified as batch type and continuous process type machines. Batch type machines have a hopper for containing a premixed batch of the thermoplastic materials to be extruded and an extruder, such as a screw extruder, coupled to the hopper for receiving the mixture therefrom. Continuous process blending and extruding machines, on the other hand, are provided with separate infeed means for continuously feeding the thermoplastic work materials to the extruder in such a way that these materials mix as they enter the extruder. In each case, the thermoplastic mixture entering the extruder is plasticized and extruded in the form of a homogeneous plastic product which may be rolled into sheets or otherwise shaped.

It is well recognized in the art that continuous process blending and extruding machines are superior in many respects to the batch type machines. The continuous process machines, for example, have a substantially higher production rate since they eliminate the necessity of premixing the granular thermoplastic work materials. However, the existing continuous process machines possess certain deficiencies which this invention seeks to overcome. A major defficiency of the existing machines of this type, for example, resides in the fact that they lack means for simply and accurately regulating the relative proportions of the different thermoplastic work materials in the thermoplastic mixture which is fed to the extruded. Such accurate proportioning of the work materials, of course, is highly desirable, if not absolutely mandatory, in most applications, particularly the color blending application referred to earlier.

As noted above, the homogeneous plastic product, or extrusion, emerging from the extruder may be utilized in various ways. Typically, the product is formed to desired shape with the aid of a suitable forming mechanism which receives the plastic product from the extruder. For example, the extruded plastic product may be passed between polish rolls which roll the plastic into sheet form. Such polish rolls are commonly adjustable to permit the sheet thickness to be varied. Proper setting of the rolls is accomplished by passing the plastic between the rolls and simultaneously adjusting the rolls until the desired sheet thickness is attained. The existing blending and extruding machines are deficient in that they are not designed to feed to such polish rolls, or other plastic forming means, an extruded plastic product other than that which results from blending an extrusion of the several thermoplastic work materials supplied to the extruder. As a consequence, the plastic which is extruded to the polish rolls during adjustment of these rolls is not a virgin plastic but colored and thus can be reused only for material with same color or must be scrapped.

Summary of the invention

This invention provides an improved blending and extruding machine of the character described which avoids the above noted and other disadvantages of the existing machines. According to one feature of the invention, for example, one of the granular thermoplastic work materials used in the machine, such as a thermoplastic color concentrate, is fed to the extruder through a variable feed conveyor. The operating speed of this conveyor may be selectively adjusted during operation of the blending machine to permit accurate proportioning of the different thermoplastic materials in the granular thermoplastic mixture fed to the extruder. Preferably, this conveyor is a screw conveyor having a conveyor screw powered by a variable speed motor whose speed may be regulated to adjust the rotary speed of the conveyor screw and hence the feed rate of the conveyor.

According to another feature of the invention, the present blending and extruding machine is equipped with means for selectively feeding to the extruder either a single thermoplastic work material or a mixture of thermoplastic work materials. The machine is set to feed the single work material to the extruder during adjustment of the plastic forming rolls or other plastic forming means which are fed by the extruder. This material may comprise a virgin thermoplastic material which could be reused after passage through the forming rolls thus eliminating the waste attendant to the existing blending machines. After the polish rolls have been properly adjusted, the machine is set to feed to the extruder a mixture of selected thermoplastic work materials.

Brief description of the drawings

FIGURE 3 is a top plan view of the machine;

FIGURE 4 is an enlarged section taken on line 4—4 in FIGURE 2;

FIGURE 5 is a section taken on line 5—5 in FIGURE 4;

FIGURE 6 illustrates a conveyor motor control embodied in the machine; and

FIGURE 7 is an exploded perspective view of a conduit coupling embodied in the machine.

Description of the preferred embodiment

Figure 1:
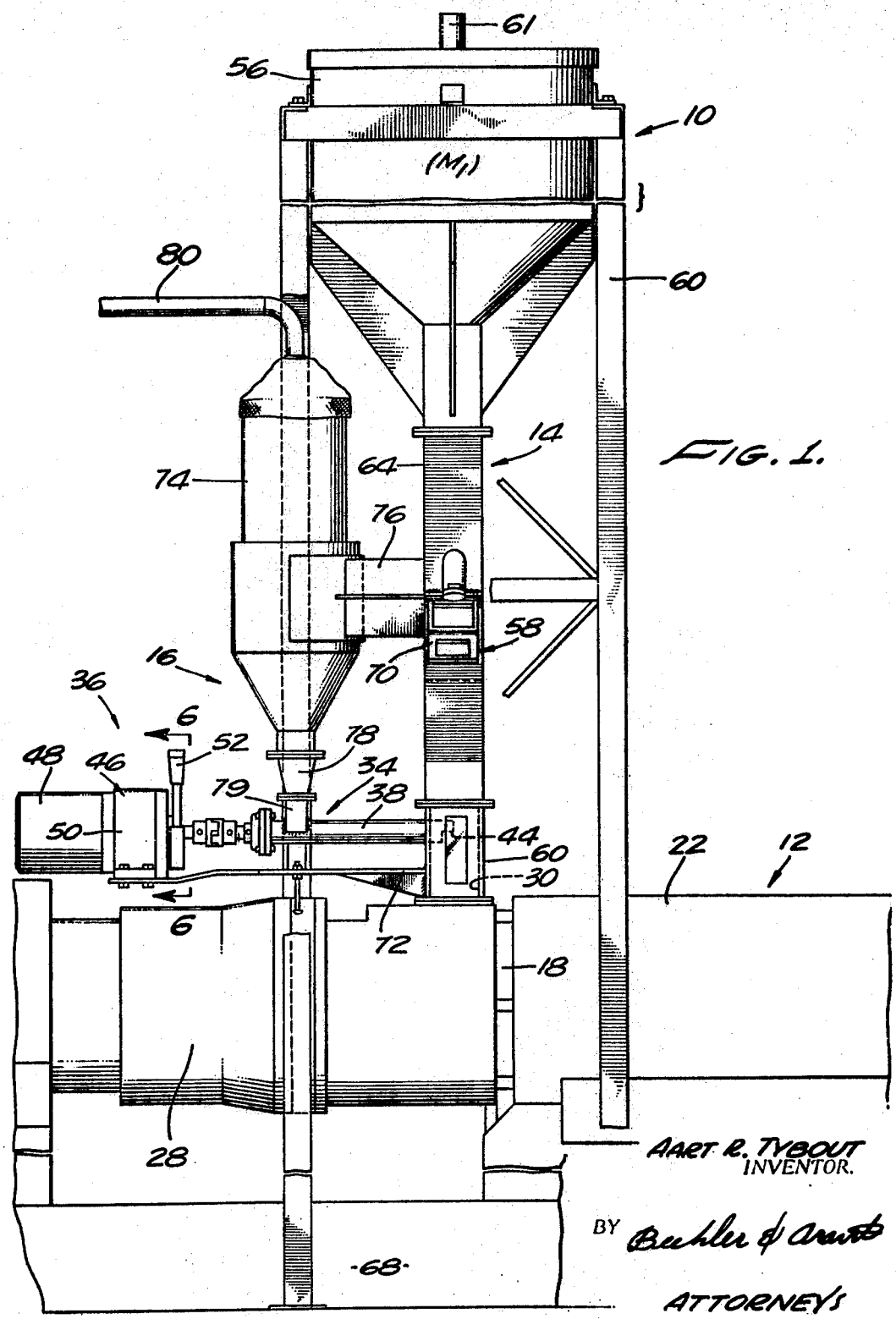
FIGURE 1 is a side elevation of a combination blending and extruding machine according to the invention.
Figure 2:
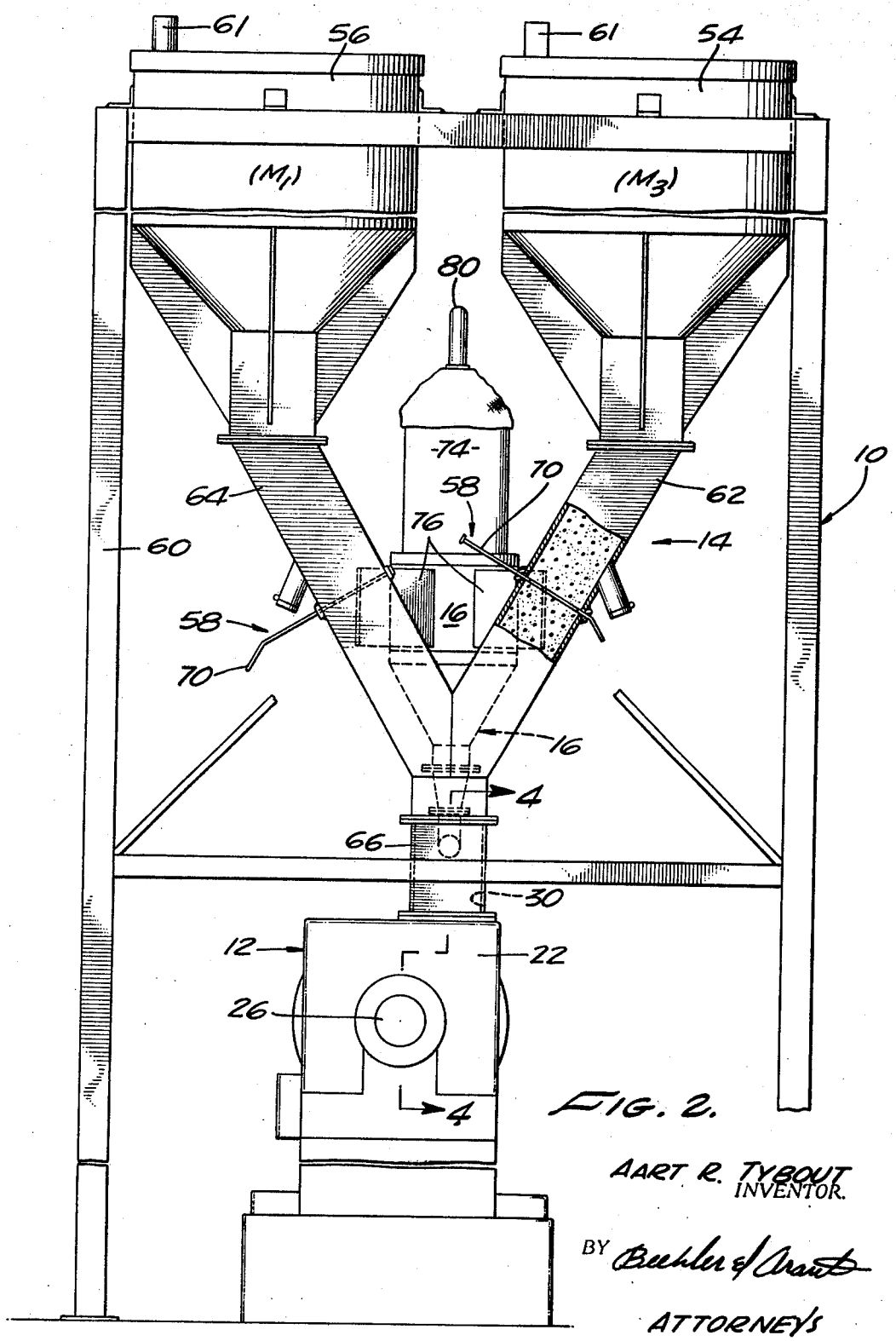
FIGURE 2 is a side elevation of the machine looking from the right hand side of FIGURE 1.

The invention provides a machine, represented in the drawings by machine 10, for blending, plasticizing, and extruding granular thermoplastic work materials. The illustrated machine, for example, is designed to blend and extrude two such work materials $M_1$ and $M_2$. In this instance, the work material $M_1$ is a thermoplastic base material, such as a virgin plastic, and the work material $M_2$ is a thermoplastic color concentrate. In general terms, the machine comprises an extruder 12 and infeed means 14, 16 for feeding the work materials $M_1$, $M_2$ to the extruder. In this instance, the extruder is a conventional screw extruder having a barrel 18 containing a rotary extrusion screw 20. Barrel 18 is encased in a heater 22. At one end of the extruder barrel 18 is a material infeed opening 24. The opposite end of the barrel contains a material outfeed or extrusion opening 26. Mounted on the infeed end of the extruder barrel 18 is a motor 28 for driving the extrusion screw 20 in a direction to feed thermoplastic work material entering through its infeed opening 24 forwardly through the barrel toward the outfeed opening 26.

The material infeed means 14 has an infeed passage 30 communicating with the extruder infeed opening 24 for conveying the thermoplastic work material $M_1$ to the extruder. The material infeed means 16 has a second infeed passage 32 for conveying the thermoplastic work material $M_2$. Extending between the infeed means 14, 16 is a variable speed conveyor 34 for feeding the work material $M_2$ at an accurately regulated rate from the infeed passage 32 to the infeed passage 30, adjacent the extruder infeed opening 24. The thermoplastic work materials $M_1$, $M_2$ do not mix as they enter the extruder 12 to provide a thermoplastic infeed mixture to the extruder. During its passage through the extruder, this thermoplastic mixture is plasticized and then extruded through the outfeed opening 26 in the form of a soft homogeneous plastic product.

According to an important feature of the invention, the material infeed conveyor 34 is provided with means 36 for regulating the conveyor feeding rate and, thereby, the relevant proportions of the thermoplastic materials $M_1$, $M_2$ in the thermoplastic mixture delivered to the extruder 12. In this instance, the conveyor 34 is a screw conveyor having a barrel 38 containing a rotary conveyor screw 40. The conveyor barrel 38 has an infeed opening 42 communicating with the material infeed passage 32 and an outfeed opening 44 communicating with the material infeed passage 30. The conveyor infeed regulating means 36 comprises a variable speed drive means 46 coupled to the conveyor screw 40 for driving the latter in rotation in the direction to feed the thermoplastic work material $M_2$ from the infeed passage 32 to the infeed passage 30. It will become evident to those versed in the art that a a variety of variable speed conveyor drive means may be employed in the present machine. The particular drive means illustrated embodies a motor 48 which is drivably connected to the conveyor screw 40 through an intervening variable speed transmission 50. A control unit 52 is provided for regulating the effective reduction ratio of the transmission 50 and, thereby, the rotary speed of the conveyor screw 40.

Briefly, during operation of the illustrated blending and extruding machine 10, the granular thermoplastic work materials $M_1$ and $M_2$ are continuously supplied to their respective infeed passages 30, 32. The conveyor drive means 46 is energized and regulated to effect feeding of the thermoplastic material $M_2$ from its infeed passage 32 to the infeed passage 30. As it enters the latter passage, the thermoplastic material $M_2$ mixes with the thermoplastic material $M_1$ within the passage to provide a granular thermoplastic mixture which enters the extruder infeed opening 24. The extruder heater 22 and motor 28 are energized to effect feeding of the thermoplastic mixture through and plasticizing of the mixture within the extruder. This plasticized mixture is then extruded through the extruder outfeed opening 26.

As noted earlier, the extruder plastic emerging from the present blending and extruding machine 10 may be utilized for various purposes and formed in various ways. In this invention, it is assumed that the extruded plastic is fed to a rolling station (not shown) containing pressure rolls for rolling the plastic into sheets. In this case, the material infeed means 14 of the blending and extruding machine 10 may comprise two separate material hoppers 54, 56 and means 58 for selectively communicating the hoppers to the material infeed passage 30. As will be explained in greater detail presently, this dual hopper arrangement is beneficial for the reason that a virgin plastic, contained in one hopper, may be extruded to the rolling station during initial adjustment of the pressure rolls at the station. During this adjustment phase, the material infeed conveyor 34 remains inoperative so that the virgin plastic is not contaminated by the thermoplastic material $M_2$. After the pressure rollers have been properly adjusted, the hopper control means 58 are set to feed the thermoplastic material $M_1$ from the other hopper to the infeed passage 30 and the conveyor 34 is powered to feed the thermoplastic material $M_2$ from the infeed passage 32 to the infeed passage 30. The blending machine then operates in its normal fashion, described earlier.

Referring now in greater detail to the drawings, the material infeed hoppers 54, 56 are mounted side by side on the upper end of an upright supporting frame 60. Means 61 are provided for filling the hoppers with selected granular thermoplastic materials. The particular blending machine illustrated, for example, is a color blending machine wherein the hopper 54 normally contains a virgin thermoplastic material $M_3$ and the hopper 56 contains a thermoplastic work material $M_1$.

In addition to the hoppers 54, 56, the material infeed means 14 comprises a pair of infeed conduits 62, 64 which extend from the lower ends of the hoppers 54, 56 and are joined at the lower ends to a common infeed conduit 66. The lower end of this latter conduit is connected to the extruder barrel 18. Infeed conduit 66 contains the infeed passage 30 which, as already noted, communicates with the extruder infeed opening 24.

The extruder 12 itself is conventional and thus need not be described in detail. Suffice it to say that the extruder is mounted in a horizontal position on a foundation 68 at the base of the hopper supporting frame 60. The extruder infeed opening 24 is located directly below the hoppers so that thermoplastic material from the hoppers may gravitate through the infeed conduits 62, 64, 66 to the extruder. As noted previously, the extruder screw 20, which is commonly tapered, is driven in a direction to feed the entering material through the extruded barrel 18 to its outfeed opening 26. As it passes through the barrel, the material is compressed, heated by the barrel heater 22, and thereby converted to a homogeneous plastic state. This homogeneous plastic is then extruded through the outfeed opening 26 of the barrel.

It will be recalled that full control means 58 are provided for selectively communicating the hoppers 54, 56 to the extruder 12. In this instance, the full control means comprise gates 70 mounted in the hopper infeed conduits 62, 64. Gates 70 may be selectively opened to permit material flow from either hopper to the extruder.

The outfeed end of the conveyor barrel 38 is secured in a horizontal position to the common infeed conduit 66 and extends to the interior of the conduit. Thus, referring to FIGURE 4, it will be observed that the barrel projects internally of the conduit to a position adjacent the longitudinal axis of the material infeed passage 30. The internal end of the barrel is opened and cut away at its bottom, as shown best in FIGURE 4, to provide the conveyor outfeed opening 44. The outer or infeed end of the conveyor barrel 38 projects a distance from the conduit 66 and is vertically supported on a bracket 72 secured to the extruder 12. Extending longitudinally through the conveyor barrel 38 is the rotary conveyor screw 40. This screw extends from a position opposite the lateral infeed opening 24 of the barrel to a position opposite the lateral outfeed opening 26 of the barrel. As already noted, the conveyor drive motor 48 is mounted on the infeed end of the conveyor barrel and drives the conveyor screw 40 through an intervening variable speed transmission 50. This transmission embodies the ratio selector 52 illustrated in FIGURE 6 for regulating the ratio of the transmission and, thereby, the rotary speed of the conveyor screw. Conveyor screw 40 is not tapered but has a uniform pitch throughout its length.

The material infeed means 16 comprises a material hopper 74 which is attached by brackets 76 to the infeed conduits 62, 64. Hopper 74 is located directly over the conveyor infeed opening 42. Extending from the hopper 74 to the conveyor barrel 38 is an infeed conduit 78. FIGURE 7 illustrates a coupling part 79 which is welded to the conveyor barrel about its infeed opening and is bolted to the infeed conduit 78 to join the latter to the conveyor. Conduit 74 defines the material infeed passage 32 which, as noted earlier, communicates with the conveyor infeed opening. The thermoplastic work material contained in the hopper 74 may thus gravitate from the hopper to the conveyor 34. Extending from the top of the hopper is a vacuum feed line 80 through which the hopper can be filled with thermoplastic material.

The operation of the illustrated blending and extruding machine 10 will now be explained. First, however, it is significant to recall that the machine may be utilized to blend and extrude various granular thermoplastic materials but is designed primarily for blending a thermoplastic base material and a thermoplastic color concentrate to provide a granular thermoplastic infeed mixture for the extruder 12. This mixture is then heated, compressed, and expelled by the extruder in the form of a homogeneous colored plastic product. This plastic product may be rolled into sheet form or otherwise processed. In this particular application, the thermoplastic base material is contained within the hopper 56 and the thermoplastic color concentrate is contained within the hopper 74. During operation of the machine, the thermoplastic base material gravitates from the hopper 56, through the infeed conduit 62, to the extruder 12. The conveyor screw 40 is driven in rotation to feed the thermoplastic color concentrate from the hopper 74 into the infeed passage 30. As the color concentrate enters this passage, it mixes with the thermoplastic base material which is currently gravitating downwardly through the passage to provide the thermoplastic extruder infeed mixture, referred to earlier. The proportion of color concentrate in the mixture may be regulated by adjusting the speed of the rotary conveyor screw 40. Thus, the color of the homogeneous plastic process extruded from the machine may be accurately controlled by regulating the conveyor screw speed. As noted earlier, the speed of the conveyor screw is adjusted by means of the control unit 52, shown in FIGURE 6.

When it becomes necessary to adjust the forming rolls or other plastic forming means which are fed from the present blending and extruding machine 10, the gate 70 for the infeed hopper 56 is closed and the gate for the infeed hopper 54 is opened. The infeed conveyor 34 is stopped. Under these conditions, only the virgin thermoplastic material from the hopper 54 is fed to the extruder 12. After the external plastic forming means have been properly adjusted, the extruded virgin plastic consumed in the adjusting process may be reground and returned to the hopper.

The screw extruder may be used as a final plasticizer as herein illustrated, or it may be used as a pre-plasticizer in conjunction with injection molding or blow molding processes.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

Having described the invention, what is claimed as new in support of Letters Patent is:

1. A machine for blending and extruding granular thermoplastic material comprising:
   a screw extruder including a barrel having material infeed and extrusion outfeed openings, a tapered rotary extrusion screw mounted within said barrel, means for driving said screw in rotation in a direction to feed thermoplastic material entering said infeed opening through said barrel to said outfeed opening, and heating means for plasticizing the entering material as it passes through said barrel, whereby said plasticized material is extruded through said outfeed opening by said screw,
   first material infeed means having an infeed passage communicating with said extruder infeed opening for conveying the first thermoplastic material to said extruder, and
   second material infeed means having a second infeed passage for conveying a second thermoplastic material, a rotary screw conveyor including a conveyor barrel having an outfeed opening at one end communicating with said first infeed passage and an infeed opening at the other end communicating with said second infeed passage, a rotary conveyor screw mounted within said conveyor barrel, and means for driving said conveyor screw in rotation in a direction to feed said second material from said second nontapered infeed passage to said first infeed passage to provide a granular thermoplastic infeed mixture for said extruder.

2. A machine according to claim 1 wherein:
   said conveyor screw drive means comprise variable speed drive means for regulating the rotary speed of said conveyor screw, thereby to regulate the feed rate of said conveyor and hence the proportion of said first and second thermoplastic materials in said infeed mixture.

3. A machine according to claim 2 wherein:
   said first material is a thermoplastic base material and said second material is a thermoplastic color concentrate, and
   adjustment of said conveyor screw speed is effective to regulate the color of the extruded plastic product from said extruder.

4. A machine according to claim 1 including:
   first and second hoppers communicating with said first infeed passage upstream of said conveyor for containing, respectively, said first thermoplastic material and a virgin thermoplastic material, and
   means for selectively communicating said hoppers to said first infeed passage, whereby the materials in said hoppers may be selectively dispensed to said extruder.

5. A machine according to claim 1 wherein:
   said infeed passages extend vertically and said extruder and conveyor barrels are horizontally disposed, and said infeed means further comprise hoppers communicating with the upper end of said infeed passages for containing said first and second thermoplastic materials, respectively, whereby said materials are adapted to gravitate from said hoppers downwardly through said infeed passages.

6. A machine according to claim 5 wherein:

said first material comprises a thermoplastic base material and said second material comprises a thermoplastic color concentrate, and said conveyor screw means comprise means for selectively regulating the rotary speed of said conveyor screw, thereby to regulate the color of the plastic product extruded from said extruder.

References Cited

UNITED STATES PATENTS

| | | |
|---|---|---|
| 2,103,546 | 12/1937 | Morrell. |
| 2,494,588 | 1/1950 | Skooglund. |
| 2,568,332 | 9/1951 | Genovese. |
| 2,933,175 | 4/1960 | Gray. |
| 3,148,412 | 9/1964 | Speeuwers. |
| 3,155,750 | 11/1964 | Dahn et al. |
| 3,177,527 | 4/1965 | Nelson. |
| 3,216,375 | 11/1965 | Ernst. |
| 3,228,065 | 1/1966 | Cournoyer et al. |

WILLIAM J. STEPHENSON, Primary Examiner